United States Patent Office 3,020,281
Patented Feb. 6, 1962

3,020,281
METHOD OF PREPARING QUINOLINE
Francis E. Cislak and William R. Wheeler, Indianapolis, Ind., assignors to Reilly Tar & Chemical Corporation, Indianapolis, Ind., a corporation of Indiana
No Drawing. Filed July 22, 1957, Ser. No. 673,122
3 Claims. (Cl. 260—283)

This invention relates to a process of preparing quinoline. More specifically, it relates to a process of preparing quinoline by the interaction of acetaldehyde with aniline and a formaldehyde hemiacetal.

The quinoline of commerce is isolated from coal tar distillates. The amount that can be produced in this manner is limited. A classical method of synthesizing quinoline is the Skraup synthesis. The Skraup procedure involves an interaction of aniline with glycerine, sulfuric acid, and an oxidizing agent. The main drawback to the Skraup method is that it does not readily lend itself to continuous operation.

We have found that we can prepare quinoline in a continuous manner by the interaction of acetylene or acetaldehyde with aniline and a mixture of methanol and formaldehyde.

When an equimolecular mixture of formaldehyde and methanol is prepared, an exothermic reaction occurs with the formation of a methyl formaldehyde hemiacetal in accordance with the equation given below:

The hemiacetals are unstable compounds and have not been isolated in the pure state. The reaction by which the hemiacetal is formed is a reversible one. Also, the reaction may proceed further to form methylal:

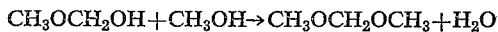

The comparatively unstable character of the formaldehyde hemiacetal and the reversible nature of the reaction by which it is formed makes it possible for most purposes to regard the hemiacetal as a solution or mixture of formaldehyde and methanol.

In carrying out our invention we prepare a mixture of methanol and formaldehyde. To this mixture there is added acetaldehyde. The methanol-formaldehyde-acetaldehyde solution is vaporized, mixed with gaseous aniline, and the resultant mixture is passed through a suitable reactor containing a catalyst. The temperature of the reactor is maintained between about 400° C. and 550° C. and preferably between about 450° C. and 500° C. We prefer to conduct our process in a continuous manner although that is not necessary.

The reactor used may be of various types. We prefer the fluid catalyst type, similar to those normally used in carrying out cracking operations in the petroleum industry. Such reactors are of tubular form with suitable connections at entrance and exit. They are provided with means for supporting the fluid bed of catalyst, and are provided with any convenient means for heating them.

The catalyst used may be any of the large number of catalysts which are useful in the preparation of 2-picoline and 4-picoline from acetylene and ammonia.

A highly satisfactory way of carrying out our invention is as follows. The parts are by weight.

*Example 1*

To 67 parts of an aqueous formaldehyde solution containing 45% formaldehyde, we add 32 parts of methanol. Considerable heat is evolved during the addition. We therefore add the methanol slowly in small portions, continually agitating the mixture during the addition. To the above prepared formaldehyde hemiacetal solution we add 62 parts of acetaldehyde. The resulting acetaldehyde-formaldehyde hemiacetal solution, hereafter referred to as AFH, is vaporized and mixed with aniline to prepare a gaseous mixture composed of 2.5 parts of AFH and one part of aniline. We pass the mixture of vapors through a fluid catalyst type reactor containing a fluidized catalytic bed of silica-alumina catalyst (13% alumina). The temperature of the reactor is maintained at about 500° C. As the vapors of aniline and AFH pass through the reactor, a reaction occurs whereby quinoline is formed. The vapors of the unchanged reactants and the reaction products are condensed as they emerge from the reactor, and the condensate is collected in a suitable receiver. The condensate as recovered contains more than 50% water. This water may be removed by the addition of flake caustic soda. The resulting dry crude bases are fractionally distilled through an efficient fractionation column.

Instead of acetaldehyde, we may use acetylene. If we use acetylene in the process of Example 1, we prepare a gaseous mixture of acetylene, formaldehyde-hemiacetal, and aniline and pass the resultant mixture through our reactor.

In place of the silica-alumina catalyst, we may use a large number of other catalysts. In general, we find that among the catalysts useful in carrying out our reaction are those catalysts which have been found useful in the preparation of 2-picoline and 4-picoline from acetylene (or acetaldehyde) and ammonia. Such catalysts include, in addition to the silica-alumina catalyst of Example 1, alumina, silica, silica-magnesia, fuller's earth, pumice, zinc chloride, zinc fluoride, cadmium chromate, cadmium fluoride, zinc phosphate, and the like.

Our invention does not reside in the discovery of a new catalyst. What we have discovered is that the interaction of acetaldehyde, or acetylene, formaldehyde hemiacetal, and aniline yields quinoline of high purity and in commercially acceptable yields.

In Example 1 the molecular equivalents of the reactants are approximately as follows: aniline, 1.7 mol; acetaldehyde, 1.5 mol; formaldehyde-hemiacetal, 1 mol (or 1 mol formaldehyde and 1 mol methanol). We need not, however, use the specific molal ratios of Example 1. The proportions of the reactants may vary widely. In general, we prefer to use an excess of aniline although that is not necessary.

The temperature at which our reaction may be conducted may be varied widely. In general, we prefer to have the reaction temperatures above about 400° C. and below about 550° C. It has been our experience that at temperatures below about 400° C., too large a proportion of the reactants pass through without reacting. At temperatures above about 550° C. we find our catalyst becomes inactivated rapidly and we obtain too many side reactions.

We claim as our invention.

1. The process of preparing quinoline which comprises mixing the vapors of acetaldehyde, formaldehyde, methanol, and aniline, passing the resultant mixture through a reactor containing a silica-alumina catalyst maintained at a temperature between about 450° C. to about 500° C. and recovering quinoline from the reaction product.

2. The process of preparing quinoline which comprises mixing the vapors of acetaldehyde, formaldehyde, methanol, and aniline, passing the resultant mixture through a reactor containing an alumina catalyst maintained at a temperature between about 450° C. to about 500° C. and recovering quinoline from the reaction product.

3. The process of preparing quinoline which comprises mixing the vapors of acetaldehyde, formaldehyde, methanol, and aniline, passing the resultant mixture through a reactor containing a zinc fluoride catalyst maintained at a temperature between about 450° C. to about 500° C. and recovering quinoline from the reaction product.

References Cited in the file of this patent

Elderfield: Heterocyclic Compounds, vol. IV, pp. 10 and 11, John Wiley, New York, N.Y., 1952.

Walker: Formaldehyde, 2nd ed., Reinhold Publ. Co., New York, N.Y., 1953, pp. 46 and 203.